United States Patent [19]

Merritt

[11] Patent Number: 5,677,645
[45] Date of Patent: Oct. 14, 1997

[54] VCCP PUMP FOR LOW VOLTAGE OPERATION

[75] Inventor: Todd Merritt, Boise, Id.

[73] Assignee: Micron Technology, Inc., Boise, Id.

[21] Appl. No.: 683,701

[22] Filed: Jul. 18, 1996

Related U.S. Application Data

[63] Continuation of Ser. No. 437,172, May 8, 1995, abandoned.

[51] Int. Cl.$^6$ .................................................... G05F 1/10
[52] U.S. Cl. ............................................ 327/536; 327/537
[58] Field of Search .................................... 327/535, 536, 327/537, 543, 589, 309, 361

[56] References Cited

U.S. PATENT DOCUMENTS

| | | | |
|---|---|---|---|
| 3,789,239 | 1/1974 | Heeren | 307/221 C |
| 4,907,102 | 3/1990 | Tsunoda et al. | 360/51 |
| 4,935,644 | 6/1990 | Tsujimoto . | |
| 5,023,465 | 6/1991 | Douglas et al. | 365/203 |
| 5,126,590 | 6/1992 | Chern | 327/536 |
| 5,140,182 | 8/1992 | Ichimura . | |
| 5,301,097 | 4/1994 | McDaniel | 363/60 |
| 5,412,257 | 5/1995 | Cordoba et al. | 327/536 |
| 5,422,586 | 6/1995 | Tedrow et al. | 327/306 |
| 5,426,333 | 6/1995 | Maeda | 327/536 |

OTHER PUBLICATIONS

Sedra et al, Microelectronic Circuits, 1991, FIG. 5.10.

*Primary Examiner*—Timothy P. Callahan
*Assistant Examiner*—Jung Ho Kim
*Attorney, Agent, or Firm*—Schwegman, Lundberg, Woessner & Kluth, P.A.

[57] ABSTRACT

A two-phase integrated circuit charge pump is described. The charge pump has two bootable pump capacitors for driving the source of two output transistors. To maximize the pump supply voltage provided by the drain of the output transistors, the gate voltages are driven by a pair of charge sharing capacitors. A delay element is provided which delays the booting of one of the charge sharing capacitors until the other is booted and its charge is shared with the first capacitor. A sufficient output transistor gate voltage, therefore, is provided during one phase to supply the maximum available pump voltage.

14 Claims, 4 Drawing Sheets

5,677,645

VCCP PUMP FOR LOW VOLTAGE OPERATION

This is a continuation of application Ser. No. 08/437,172, filed May 8, 1995, now abandoned.

TECHNICAL FIELD OF THE INVENTION

The present invention relates generally to integrated circuits and in particular the present invention relates charge pumps.

BACKGROUND OF THE INVENTION

Integrated circuits often require supply voltages of greater potential than that provided by an external voltage source. Memory circuits such as dynamic random access memories (DRAMs) and video DRAMs require higher internal voltages to pre-charge memory word lines and the like. Integrated circuits which are used in systems dependent upon a limited external power supply, such as a battery, must generate the additional supply voltages using conversion circuitry. Charge pumps are known in the art as on-chip voltage generators capable of providing a voltage more positive than the most positive external supply or more negative than the most negative external supply.

New generation integrated circuits used in densely populated devices, such as portable computers and phones, require low voltage operation and reduced power consumption. In low voltage circuits, conventional charge pumps run out of head room. That is, the pumps are unable to reach the required maximum voltage using the low voltage supply. For example, U.S. Pat. No. 5,126,590 entitled "High Efficiency Charge Pump" issued to Chern describes a charge pump which suffers from head room problems and inefficiency. The maximum pump voltage attainable with the Chern pump is $2Vcc-Vt$, where Vcc is the external supply voltage and Vt is a threshold voltage. It can be seen that in a low voltage circuit the pump voltage cannot reach an acceptable level. Further, four-phase charge pumps have been developed which provide a solution to the low voltage operation problems but sacrifice die area due to the number and size of capacitors required.

For the reasons stated above, and for other reasons stated below which will become apparent to those skilled in the art upon reading and understanding the present specification, there is a need in the art for a low voltage charge pump which solves the head room problem of conventional charge pumps while reducing the die area and increasing the power efficiency of four phase charge pumps.

SUMMARY OF THE INVENTION

The above-mentioned problems with integrated circuit charge pumps and other problems are addressed by the present invention and which will be understood by reading and studying the following specification. A low voltage two phase charge pump is described which produces a pump voltage. The charge pump uses delay elements and requires only two pump capacitors. A sufficient output transistor gate voltage is generated during one phase to provide the maximum available pump voltage.

In particular, the present invention describes an integrated circuit charge pump which comprises an output transistor, a boot capacitor electrically coupled to a source of the output transistor, a plurality of charge sharing capacitors electrically connected to a gate of the output transistor, and a delay element associated with one of the plurality of charge sharing capacitors.

In another embodiment, a two-phase charge pump for producing a pump voltage on an output line comprises a plurality of output transistors having their drains connected to the output line, and a plurality of boot capacitors, each electrically coupled to a source of one of the plurality of output transistors. The charge pump also comprises a plurality of first charge sharing capacitors, each electrically coupled to a gate of one of the plurality of output transistors, and a plurality of second charge sharing capacitors, each electrically coupled to one of the plurality of first charge sharing capacitors. Finally, the charge pump includes a plurality of delay elements, each electrically associated with one of the plurality of second charge sharing capacitors.

In an additional embodiment, the integrated circuit charge pump can comprise a pre-charge circuit for pre-charging a boot capacitor and the charge sharing capacitors to an external supply voltage level. A boot signal circuit can be used for booting the boot capacitor and one of charge sharing capacitors. Further, a charge sharing circuit can be used to electrically couple the charge sharing capacitors in response to a voltage level of the boot capacitor.

In still another embodiment, a method of producing a pump supply voltage in an integrated circuit comprises the steps of pre-charging a pump capacitor to a pre-determined level, and pre-charging first and second charge sharing capacitors to a pre-determined level. The method then comprises booting the pump capacitor to substantially pump the supply voltage, booting the first charge sharing capacitor to a first booted level, and charge sharing the first booted level of the first charge sharing capacitor with the second charge sharing capacitor. The second charge sharing capacitor is booted to a second booted level. Finally, the steps of coupling the second charge sharing capacitor to a gate of an output transistor, and coupling the pump capacitor to a source of the output transistor are conducted.

An alternate method of producing a pump supply voltage in an integrated circuit comprising a two-phase charge pump comprises the steps of pre-charging a pump capacitor, and first and second charge sharing capacitors to a predetermined level during a first phase. The pump capacitor and first charge sharing capacitor are booted during a second phase. The first and second charge sharing capacitor are coupled to share their charges, and the second charge sharing capacitor is booted. Finally, the second charge sharing capacitor is coupled to a gate of an output transistor, and the pump capacitor is coupled to a source of the output transistor during the second phase. Additionally, the methods can include the step of delaying a boot signal to the second charge sharing capacitor while booting the first charge sharing capacitor.

DETAILED DESCRIPTION OF THE INVENTION

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Each transistor described herein is an N-channel field-effect transistor (FET) having a gate, a first current node (drain) and a second current node (source). Since an FET is typically a symmetrical device, the true designation of "source" and "drain" is only possible once a voltage is impressed on the terminals. The designations of source and drain herein should be interpreted, therefore, in the broadest sense.

The capacitors described herein can be any capacitor fabricated on an integrated circuit using any fabrication technique. The capacitors described herein, however, are preferably fabricated as N-channel transistors having their source and drain electrically connected. The transistor acts as a capacitor so long as the gate voltage is more than Vt (threshold voltage) above the source/drain connection.

As known in the art, "booting" a capacitor refers to the principle that the charge on a capacitor cannot change instantaneously. That is, if the voltage on a first side of a capacitor is instantaneously increased, the second side of the capacitor will increase by the same amount. The voltage on the second side of the capacitor is therefore "booted" higher. Further, the terms "high" and "low" as used herein refer to Vcc (supply voltage) and ground, respectively.

Figure 1:
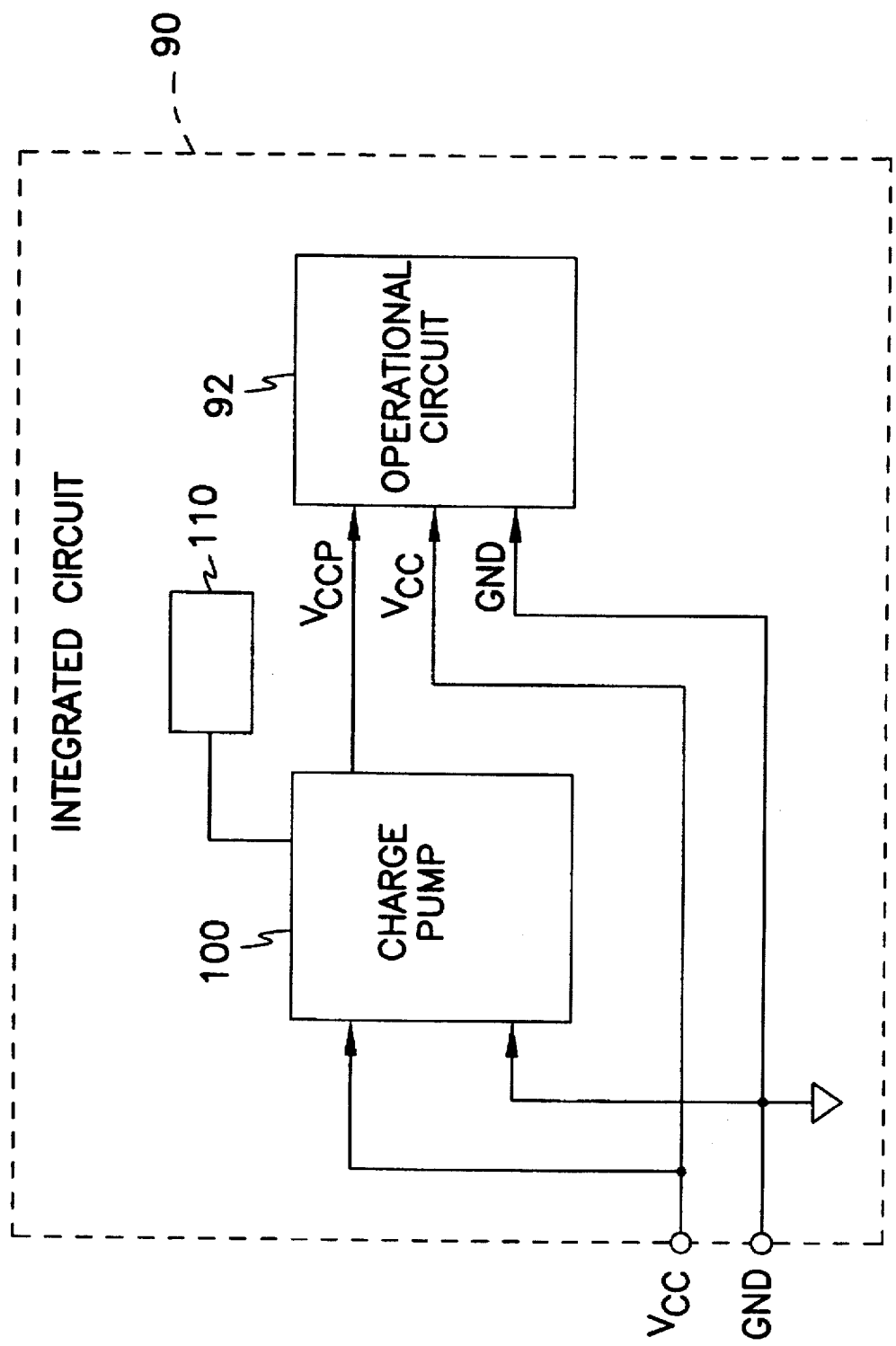
FIG. 1 is a block diagram of an integrated circuit of the present invention.

The integrated circuit 90 of the present invention as shown in FIG. 1 has a charge pump 100, an oscillator 110 and operational circuit 92. The operational circuit can be any functional circuit, for example, a DRAM or VRAM. The charge pump converts Vcc provided by an external power supply into a higher potential Vccp. The operational circuit, therefore, has both Vcc and Vccp available.

Figure 2:
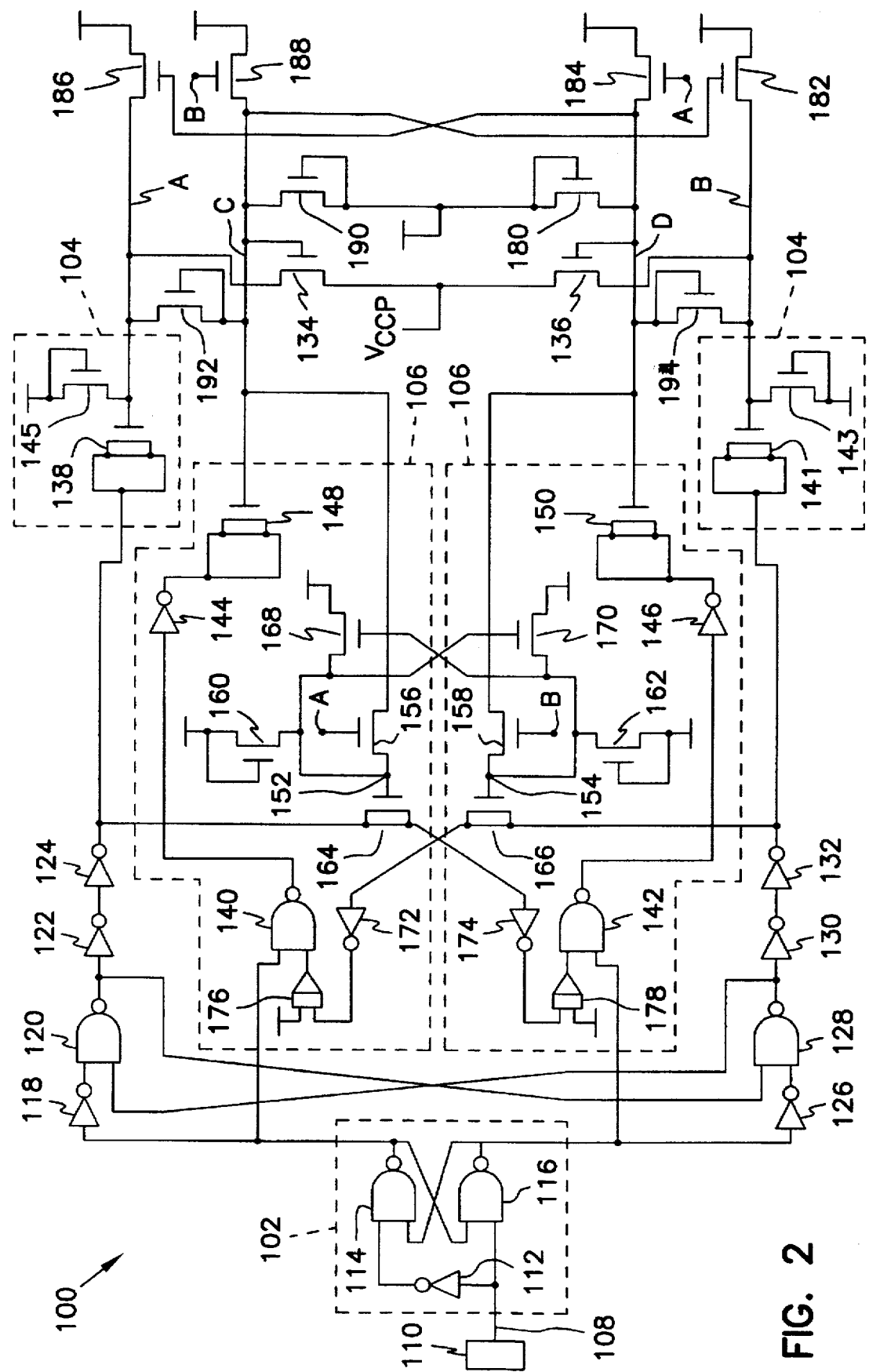
FIG. 2 is a schematic of a charge pump of the present invention.

Referring to FIG. 2, the charge pump 100 includes a two phase generator 102, two phase boot circuits 104, two charge sharing gate driver circuits 106 and additional circuitry. The phase generator receives an oscillating signal and produces two logical phases therefrom. The charge pump is designed symmetrically, such that during a first phase the pump provides a pump voltage Vccp using one-half of the pump circuit and during the second phase Vccp is provided using the other-half of the circuit. The operation of the charge pump is described in detail below following a description of the charge pump circuit.

Figure 3:
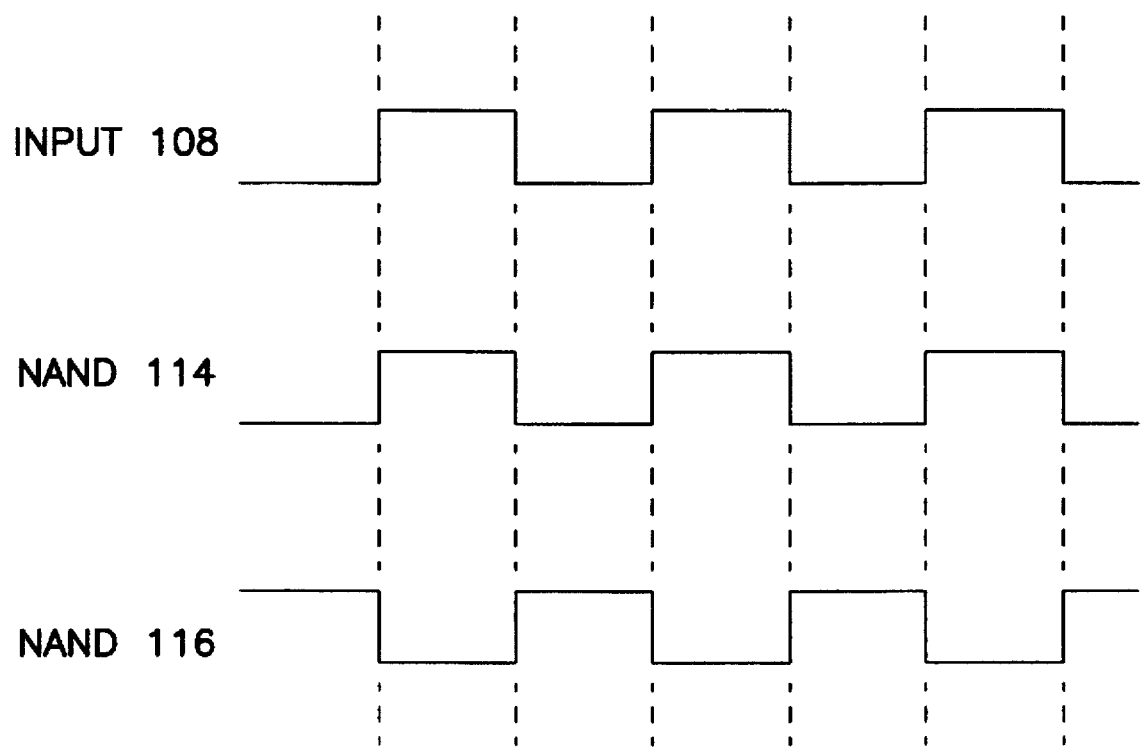
FIG. 3 is a timing diagram of a phase generator of the charge pump of FIG. 2.

The two phase generator 102 has an input 108 for receiving an oscillating signal produced by oscillator 110 located on the integrated circuit 90. Nand gates 114 and 116 formed as a flip flop, use inverter 112 and the oscillating input to latch and produce outputs which are in opposite states. These outputs are directly connected to one of the charge sharing gate driver circuits 106, and indirectly connected to both a charge sharing gate driver circuit 106 and one of the phase boot circuits 104 using a flip flop circuit. FIG. 3 illustrates the outputs of nand gates 114 and 116 in response to the input from oscillator 110. When the input is high, the output of nand gate 114 is also high while the output of nand gate 116 is low. Likewise, when the input is low, the output of nand gate 114 is low while the output of nand gate 116 is high.

The outputs of nand gates 114 and 116 are connected to inverters 118 and 126. Gates 118, 120, 122, 124, 126, 128, 130 and 132 form a flip flop such that the output of inverters 124 and 132 are latched to the same state as the inputs to inverters 118 and 126, respectively. The outputs of inverters 124 and 132 are connected to both a charge sharing gate driver circuit 106 and a phase boot circuit 104.

Phase boot circuits 104 provide the source voltage to output transistors 134 and 136 via Nodes A and B during one phase of the charge pump, as described below. Output transistors 134 and 136 each provide the charge pump output Vccp during one phase of the charge pump. Each phase boot circuit 104 has a N-channel transistor 138 or 141 formed as a pump capacitor. The phase boot circuits also have a charging transistor 145 or 143 for pre-charging the pump capacitors.

The charge sharing gate driver circuits 106 are unique circuits used to drive the gate voltage on output transistors 134 or 136 via Nodes C and D. The gate voltage, therefore, must be at least a threshold voltage (Vt) above the source voltage to provide the maximum voltage available as Vccp.

Charge sharing gate driver circuits 106 have a nand gate 140 or 142 connected to the output of nand gates 114 or 116, respectively. The output of nand gates 140 or 142 are connected to either inverters 144 or 146 which in turn are each coupled to Nodes C and D through either capacitor 148 or 150. Nodes C and D are also connected to the drains of transistors 156 and 158, respectively. The gate of transistor 156 is connected to Node A and its source (node 152) is connected to both the gate of transistor 164, formed as a capacitor, and the drain of transistor 160. Likewise, the gate of transistor 158 is connected to Node B and its source (node 154) is connected to both the gate of transistor 166, formed as a capacitor, and the drain of transistor 162. Transistors 160 and 162 have their gates and sources connected to Vcc. Further, the drains of transistors 160 and 162 are cross-coupled to transistors 168 and 170.

Capacitors 164 and 166 are connected to both the output of inverters 124 and 132, respectively, and the input of inverters 174 and 172, respectively. The output of inverter 172 is connected to delay element 176 which is connected to an input of nand gate 140. Inverter 174 is a mirror circuit of inverter 172. That is, the output of inverter 174 is connected to delay element 178 which is connected to an input of nand gate 142. Delay elements 176 and 178 can be any delay element, but is preferably an RC network.

Additional circuit elements shown in FIG. 1 will be described below as the operation of the charge pump is detailed.

Charge Pump Operation

Figure 4:
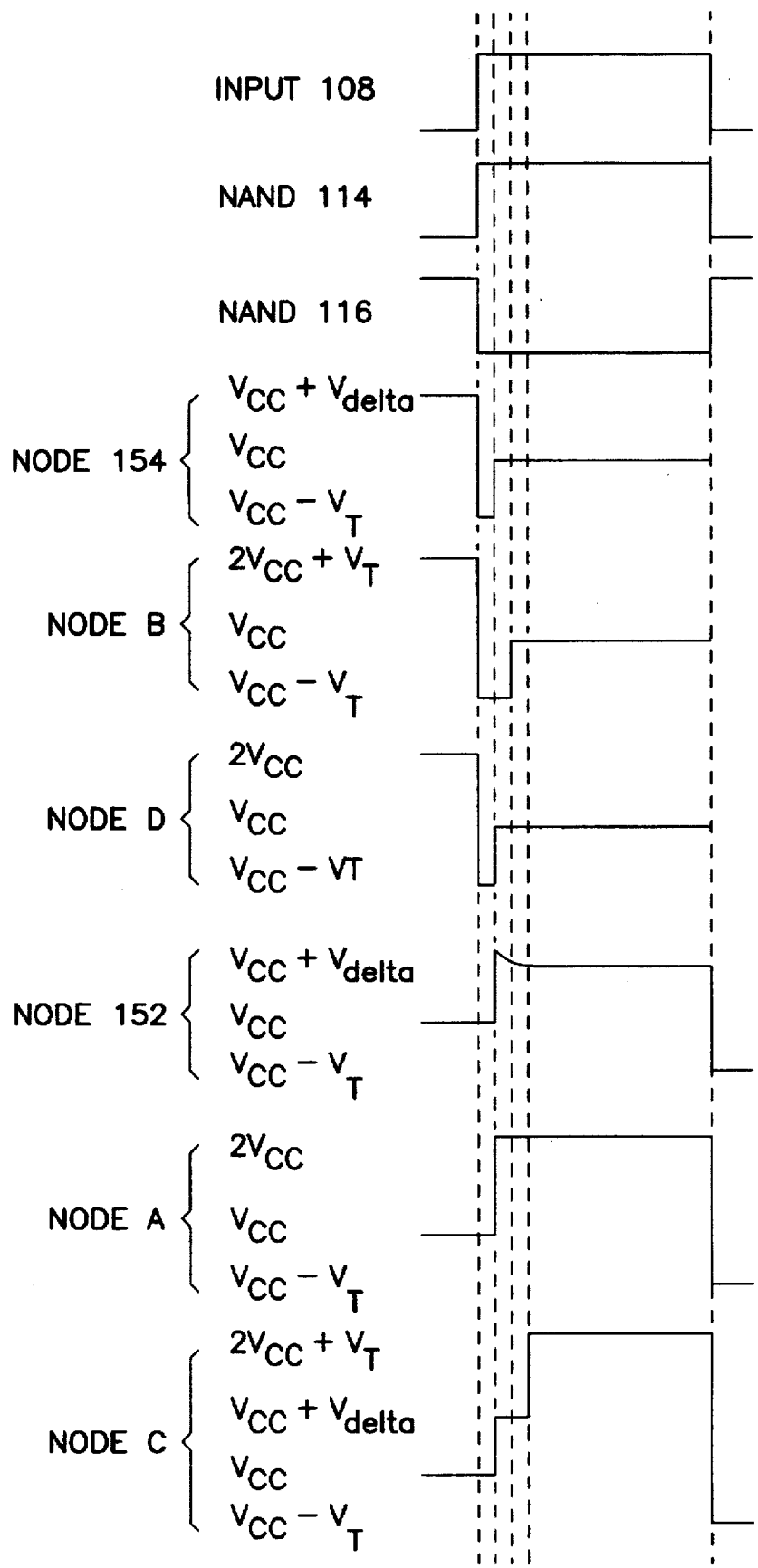
FIG. 4 is a timing diagram of the charge pump of FIG. 2 during one phase of operation.

Charge pump 100 is a two phase circuit, therefore, only one half of the charge pump is producing Vccp at any given time. The first phase is herein defined as the time when the output of nand gate 114 is high and the second phase is defined as the time when the output of nand gate 116 is high. To understand the operation of the charge pump, the transition from the second phase to the first phase is detailed and shown in FIG. 4.

To initiate the first phase, the oscillating input 108 transitions from a low state to a high state. The output of inverter 112, therefore, goes low. As stated above, the output of nand gate 114 goes high and the output of nand gate 116 goes low. When the output of nand gate 114 goes high, inverter 118 goes low, nand gate 120 goes high, inverter 122 goes low and inverter 124 goes high. Likewise, as the output of nand gate 116 goes low, inverter 126 goes high, nand gate 128 goes low, inverter 130 goes high and inverter 132 goes low.

The output of nand gate 142 goes high and the output of inverter 146 thereby goes low. Node D is coupled low through capacitor 150. Node D is, however, clamped to Vcc–Vt by transistor 180. That is, transistor 180 having its gate and source connected to Vcc has a drain voltage of Vcc–Vt such that capacitor 150 maintains a charge equal thereto.

Node B is coupled low through pump capacitor 141 as the output of inverter 132 goes low. Node B is, however clamped to Vcc–Vt by transistor 143 so that capacitor 141 maintains a charge of Vcc–Vt. Similarly, capacitor 166 maintains a charge of Vcc–Vt through transistor 162. Capacitors 141, 150, and 166 are all ultimately charged to Vcc through transistors 182, 184 and 170, respectively, as explained below.

Pump capacitor 138 and Node A have been pre-charged to Vcc through transistor 186 on the previous phase. Node A is booted to a higher voltage through capacitor 138 as the output of inverter 124 goes high. This higher voltage is preferably 2Vcc. Likewise, because capacitor 164 has been pre-charged to Vcc, the voltage at node 152 is booted higher. The charge on capacitor 164 is shared with capacitor 148. Through transistor 156 when the gate voltage increases as a result of Node A being booted to 2Vcc. Because capacitor 148 was pre-charged to Vcc, the resultant charge on capacitor 148 is Vcc+Vdelta, where Vdelta is preferably at least Vt.

As a result of inverter 132 going low, the output of inverter 172 goes high. This signal is delayed by delay element 176 and provided as an input to nand gate 140. It is during this delay that capacitor 148 is charged to Vcc+Vdelta. With both inputs high, the output of nand gate 140 goes low and the output of inverter 144 goes high. The resultant increase in voltage on capacitor 148 boots Node C to a maximum voltage of 2Vcc+Vt. This maximum is insured through clamping transistor 192. Node C is the gate voltage for transistor 134. Transistor 134, having a source voltage of 2Vcc and a gate voltage of 2Vcc+Vt, provides a maximum Vccp voltage.

Transistor 182 charges pump capacitor 141 to Vcc when Node C exceeds Vcc+Vt. Likewise, capacitor 150 is charged to Vcc through transistor 184 when the node A exceeds Vcc+Vt. Further, capacitor 166 is charged to Vcc through transistor 170 when node 152 exceeds Vcc+Vt.

It will be recognized that the charge pump is mirrored about the outputs of nand gates 114 and 116. As a result, the operation of the circuit is substantially the same during the second phase. That is, capacitors 141, 150 and 166 are booted so that transistor 136 provides Vccp a voltage of up to 2Vcc and capacitors 138, 148 and 164 are pre-charged to Vcc.

Typical values for voltages referred to herein are, Vcc=3 volts, Vccp=4.5 volts, and Vt=0.7 volts. It will be understood that different voltage levels could be used and are not intended to limit the scope of the present invention.

Conclusion

A low voltage two-phase charge pump is described which produces a Vccp voltage of up to 2Vcc. The head room of conventional charge pumps is overcome while reducing the power requirement and die area of other low voltage charge pumps. The charge pump uses delay elements and requires only two pump capacitors which are used 50% of the time. This is a substantial improvement over four-phase charge pumps which use 4 pump capacitors that are active only 25% of the time. The delay elements allow a sufficient output transistor gate voltage to be generated during one phase to provide the maximum available pump voltage.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An integrated circuit charge pump comprising:
    an output transistor having a first connection, a second connection and a gate;
    a clock circuit having a clock signal output;
    a boot capacitor having a first plate electrically coupled to the first connection of the output transistor, and a second plate electrically coupled to the clock signal output;
    a first charge sharing capacitor having first and second plates, the first plate electrically coupled to the gate of the output transistor;
    a second charge sharing capacitor having first and second plates, the second plate electrically coupled to the clock signal output;
    a coupling transistor, having a source connected to the gate of the output transistor, a drain connected to the first plate of the second charge sharing capacitor, and a gate connected to the first plate of the boot capacitor, wherein the gate is connected to a different node from the source drain; and
    a delay element electrically located between the clock signal output and the second plate of the first charge sharing capacitor.

2. The integrated circuit charge pump of claim 1 further comprising:
    a plurality of pre-charge circuits for pre-charging the boot capacitor and the first and second charge sharing capacitors to an external supply voltage level.

3. The integrated circuit charge pump of claim 1 further comprising:
    a boot signal circuit connected to the clock signal output for increasing charges stored on the boot capacitor and second charge sharing capacitor.

4. The integrated circuit charge pump of claim 1 wherein the coupling circuit comprises:
    a transistor having a first connection, a second connection and a gate, the first connection coupled to the gate of the output transistor, the second connection coupled to the first plate of the second charge sharing capacitor, and the gate coupled to the first plate of the boot capacitor.

5. A two-phase charge pump for producing a pump voltage on an output line comprising:
    a plurality of output transistors each having a first connection, a second connection and a gate, the first connections being connected to the output line;
    a plurality of boot capacitors, each one of the plurality of boot capacitors having a first plate electrically coupled to the second connection of one of the plurality of output transistors, and a second plate coupled to a clock;
    a plurality of first charge sharing capacitors, each one of the plurality of first charge sharing capacitors having first and second plates, the first plate electrically coupled to the gate of one of the plurality of output transistors;

a plurality of second charge sharing capacitors, each one of the plurality of second charge sharing capacitors having first and a second plates, the second plate electrically coupled to the clock;

a plurality of coupling transistors, each one of the plurality of coupling transistors having a source connected to the gate of one of the plurality of output transistors, a drain connected to a plate of one of the plurality of second charge sharing capacitors, and a gate connected to the first plate of one of the plurality of boot capacitors, wherein the gate is connected to a different node from the source and drain; and a plurality of delay elements, each one of the plurality of delay elements electrically located between the clock and the second plate of the plurality of first charge sharing capacitors.

6. The two-phase charge pump of claim 5 further comprising:

a plurality of pre-charge circuits for pre-charging the plurality of boot capacitors, the plurality of first charge sharing capacitors, and the plurality of second charge sharing capacitors to an external supply voltage level.

7. A method of producing a pump supply voltage in an integrated circuit, the method comprising the steps of:

pre-charging a pump capacitor to a pre-determined level, the pump capacitor having a first plate electrically coupled to a first connection of an output transistor, and a second plate electrically coupled to a clock circuit;

pre-charging first and second charge sharing capacitors to pre-determined levels, the first charge sharing capacitor having a first plate coupled to the clock circuit;

providing a signal with the clock circuit to substantially increase the charge on the pump capacitor and increase the charge on the first charge sharing capacitor to a first booted level;

charge sharing the first booted level of the first charge sharing capacitor with the second charge sharing capacitor through a coupling transistor having a drain coupled to the first charge sharing capacitor, a source coupled to the second charge sharing capacitor, and a gate connected to the first plate of the pump capacitor, wherein the gate is connected to a different node from the source and drain;

providing a clock signal to a first plate of the second charge sharing capacitor to increase the charge on the second charge sharing capacitor to a second booted level; and coupling the second charge sharing capacitor to a gate of the output transistor.

8. The method of claim 7 wherein the step of providing the clock signal to the second charge sharing capacitor comprises the step of providing a delayed clock signal to the second charge sharing capacitor while increasing the charge on the first charge sharing capacitor to a first booted level.

9. A method of producing a pump supply voltage in an integrated circuit comprising a two-phase charge pump, the method comprising the steps of:

pre-charging a pump capacitor, and first and second charge sharing capacitors to pre-determined levels during a first phase, the pump capacitor having a first plate electrically coupled to a first connection of an output transistor, and a second plate electrically coupled to a clock circuit;

providing a signal with the clock circuit to substantially increase the charge on the pump capacitor and increase the charge on the first charge sharing capacitor to a first booted level during a second phase;

charge sharing the first booted level of the first charge sharing capacitor with the second charge sharing capacitor through a coupling transistor during the second phase, the coupling transistor having a drain coupled to the first charge sharing capacitor, a source coupled to the second charge sharing capacitor, and a gate connected to the first plate of the pump capacitor, wherein the gate is connected to a different node from the source and drain;

providing a clock signal to the second charge sharing capacitor to increase the charge on the second charge sharing capacitor to a second booted level during the second phase; and coupling the second charge sharing capacitor to a gate of the output transistor during the second phase.

10. The method of claim 9 wherein the step of providing the clock signal to the second charge sharing capacitor comprises the step of providing a delayed clock signal to the second charge sharing capacitor while increasing the charge on the first charge sharing capacitor to a first booted level during the second phase.

11. An integrated circuit charge pump comprising:

an output transistor having a first connection, a second connection and a gate;

a clock circuit having a clock signal output;

a boot capacitor having a first plate electrically coupled to the first connection of the output transistor, and a second plate electrically coupled to the clock signal output;

a first charge sharing capacitor having first and second plates, the first plate electrically coupled to the gate of the output transistor;

a second charge sharing capacitor having first and second plates, the second plate electrically coupled to the clock signal output;

a coupling circuit having an output connection connected to the gate of the output transistor and a first input connected to the first plate of the second charge sharing capacitor, and a second input for receiving an activation signal, the coupling circuit for coupling a voltage provided at the first input to the output connection in response to the activation signal, the activation signal being independent of either the first input or output connection of the coupling circuit; and a delay element electrically located between the clock signal output and the second plate of the first charge sharing capacitor.

12. The integrated circuit charge pump of claim 11 wherein the coupling circuit is a coupling transistor having a drain coupled to the first charge sharing capacitor, a source coupled to the second charge sharing capacitor, and a gate connected to the first plate of the boot capacitor.

13. A method of producing a pump supply voltage in an integrated circuit, the method comprising the steps of:

pre-charging a pump capacitor to a pre-determined level, the pump capacitor having a first plate electrically coupled to a first connection of an output transistor, and a second plate electrically coupled to a clock circuit;

pre-charging first and second charge sharing capacitors to pre-determined levels, the first charge sharing capacitor having a first plate coupled to the clock circuit;

providing a signal with the clock circuit to substantially increase the charge on the pump capacitor and increase the charge on the first charge sharing capacitor to a first booted level;

charge sharing the first booted level of the first charge sharing capacitor with the second charge sharing capacitor through a coupling circuit, the coupling circuit having an output connection connected to the second charge sharing capacitor and a first input connected to the first charge sharing capacitor, and a second input for receiving an activation signal, the coupling circuit for coupling a voltage provided at the first input to the output connection in response to the activation signal, the activation signal being independent of either the first input or output connection of the coupling circuit;

providing a clock signal to a first plate of the second charge sharing capacitor to increase the charge on the second charge sharing capacitor to a second booted level; and coupling the second charge sharing capacitor to a gate of the output transistor.

14. The method of claim 13 wherein the coupling circuit comprises a transistor having a drain coupled to the first charge sharing capacitor, a source coupled to the second charge sharing capacitor, and a gate connected to the first plate of the pump capacitor.

* * * * *